(12) United States Patent
Sakuta

(10) Patent No.: US 11,518,318 B2
(45) Date of Patent: Dec. 6, 2022

(54) SHOVEL

(71) Applicant: SUMITOMO(S.H.L) CONSTRUCTION MACHINERY CO., LTD., Tokyo (JP)

(72) Inventor: Sou Sakuta, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 582 days.

(21) Appl. No.: 16/534,086

(22) Filed: Aug. 7, 2019

(65) Prior Publication Data

US 2019/0359145 A1 Nov. 28, 2019

Related U.S. Application Data

(63) Continuation of application No. PCT/JP2018/007710, filed on Mar. 1, 2018.

(30) Foreign Application Priority Data

Mar. 2, 2017 (JP) .............................. JP2017-039216

(51) Int. Cl.
| | | |
|---|---|---|
| B60R 11/02 | (2006.01) |
| E02F 9/16 | (2006.01) |
| E02F 9/20 | (2006.01) |
| E02F 9/26 | (2006.01) |
| B60R 11/00 | (2006.01) |
| E02F 3/32 | (2006.01) |

(52) U.S. Cl.
CPC ............ *B60R 11/0229* (2013.01); *E02F 9/16* (2013.01); *E02F 9/2004* (2013.01); *E02F 9/26* (2013.01); *B60R 2011/0005* (2013.01); *B60R 2011/0052* (2013.01); *B60R 2011/0066* (2013.01); *E02F 3/32* (2013.01)

(58) Field of Classification Search
CPC ......... B60R 11/0229; B60R 2011/0005; B60R 2011/0052; B60R 2011/0066; E02F 9/16; E02F 9/2004; E02F 9/26; E02F 3/32
See application file for complete search history.

(56) References Cited

U.S. PATENT DOCUMENTS

| 9,702,112 B2 | 7/2017 | Shioji et al. |
| 2006/0266573 A1 | 11/2006 | Ishii et al. |

(Continued)

FOREIGN PATENT DOCUMENTS

| DE | 102019131842 A1 * | 5/2020 | ............ B60K 37/06 |
| DE | 102019202005 B3 * | 6/2020 | |

(Continued)

OTHER PUBLICATIONS

International Search Report for PCT/JP2018/007710 dated May 22, 2018.

*Primary Examiner* — Hilary L Gutman
(74) *Attorney, Agent, or Firm* — IPUSA, PLLC

(57) ABSTRACT

A shovel includes a lower travelling body, an upper swiveling body that is mounted on the lower travelling body so as to freely swivel relative to the lower travelling body, an operator cab that is mounted on the upper swiveling body, and a monitor attaching base that is installed inside the operator cab so as to extend in right and left directions and includes a plurality of attaching units, to which a display device is attachable.

13 Claims, 10 Drawing Sheets

(56) References Cited

U.S. PATENT DOCUMENTS

| | | | |
|---|---|---|---|
| 2009/0224898 | A1 | 9/2009 | Graeve et al. |
| 2011/0068241 | A1 | 3/2011 | Suddarth |
| 2014/0070568 | A1 | 3/2014 | Tabeta et al. |
| 2014/0246468 | A1* | 9/2014 | Montgomery ......... B60K 37/02 224/548 |
| 2014/0263511 | A1* | 9/2014 | Clements ................ B60R 11/02 224/483 |
| 2015/0216060 | A1 | 7/2015 | Saitou et al. |
| 2016/0265196 | A1 | 9/2016 | Shimizu |
| 2022/0227305 | A1* | 7/2022 | Wraith ................... B60R 11/02 |
| 2022/0227306 | A1* | 7/2022 | Roupe .................... B60R 11/02 |

FOREIGN PATENT DOCUMENTS

| | | |
|---|---|---|
| JP | H05-079059 | 3/1993 |
| JP | 2005-119362 | 5/2005 |
| JP | 2007-063778 | 3/2007 |
| JP | 2014-037680 | 2/2014 |
| JP | 2014-136943 | 7/2014 |
| JP | 5989786 | 9/2016 |
| JP | 2017-008582 | 1/2017 |
| WO | 2013/021725 | 2/2013 |

* cited by examiner

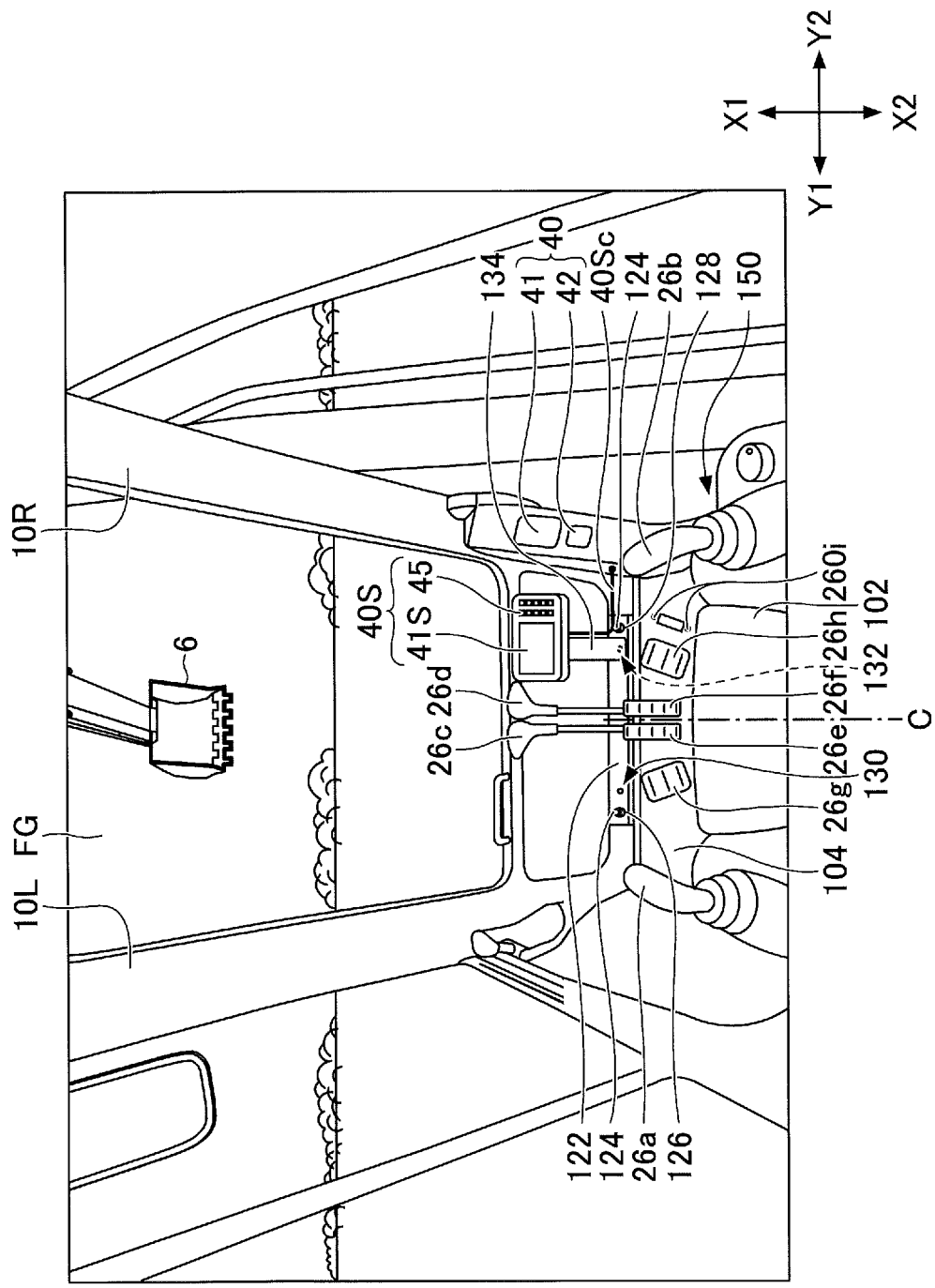

SHOVEL

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2018/007710 filed on Mar. 1, 2018, which is based upon and claims the benefit of priority of the prior Japanese Patent Application No. 2017-039216 filed on Mar. 2, 2017, the entire contents of which are incorporated herein by reference.

BACKGROUND OF THE INVENTION

1. Field of the Invention

The present invention relates to a shovel.

2. Description of the Related Art

Operators who operate shovels as construction machines require skilled operating techniques to efficiently and accurately perform such operations as excavation or the like by using an attachment.

Accordingly, a shovel having a function to guide the operation of the shovel (hereinafter, referred to as the "machine guidance function") is known so that even an operator who has little experience in operating the shovel can perform work accurately.

In such shovels, a large display device is mounted in the cabin to display much information about the machine guidance function. The large display devices is mounted, for example, on a pillar adjacent to an attachment of a pair of front pillars (see, for example, Patent Document 1).

[Patent Document 1] Japanese Unexamined Patent Publication No. 2014-136943

However, in the above shovel, depending on the content of the work and working part, the large display device may obstruct the visibility for the work, and the operability may be lowered.

Accordingly, in light of the above-mentioned issues, the purpose of the present invention is to provide a shovel that can change the attaching position of the display device according to the work content and the working part.

SUMMARY OF THE INVENTION

According to an embodiment of the present invention, shovel includes a lower travelling body, an upper swiveling body that is mounted on the lower travelling body so as to freely swivel relative to the lower travelling body, an operator cab that is mounted on the upper swiveling body, and a monitor attaching base that is installed inside the operator cab so as to extend in right and left directions and includes a plurality of attaching units, to which a display device is attachable.

BRIEF DESCRIPTION OF THE DRAWINGS

FIG. 4B is a view obtained in a shovel illustrated in FIG. 1 when viewing forward from the inside of the cabin.

DETAILED DESCRIPTION OF EMBODIMENTS

Figure 1:
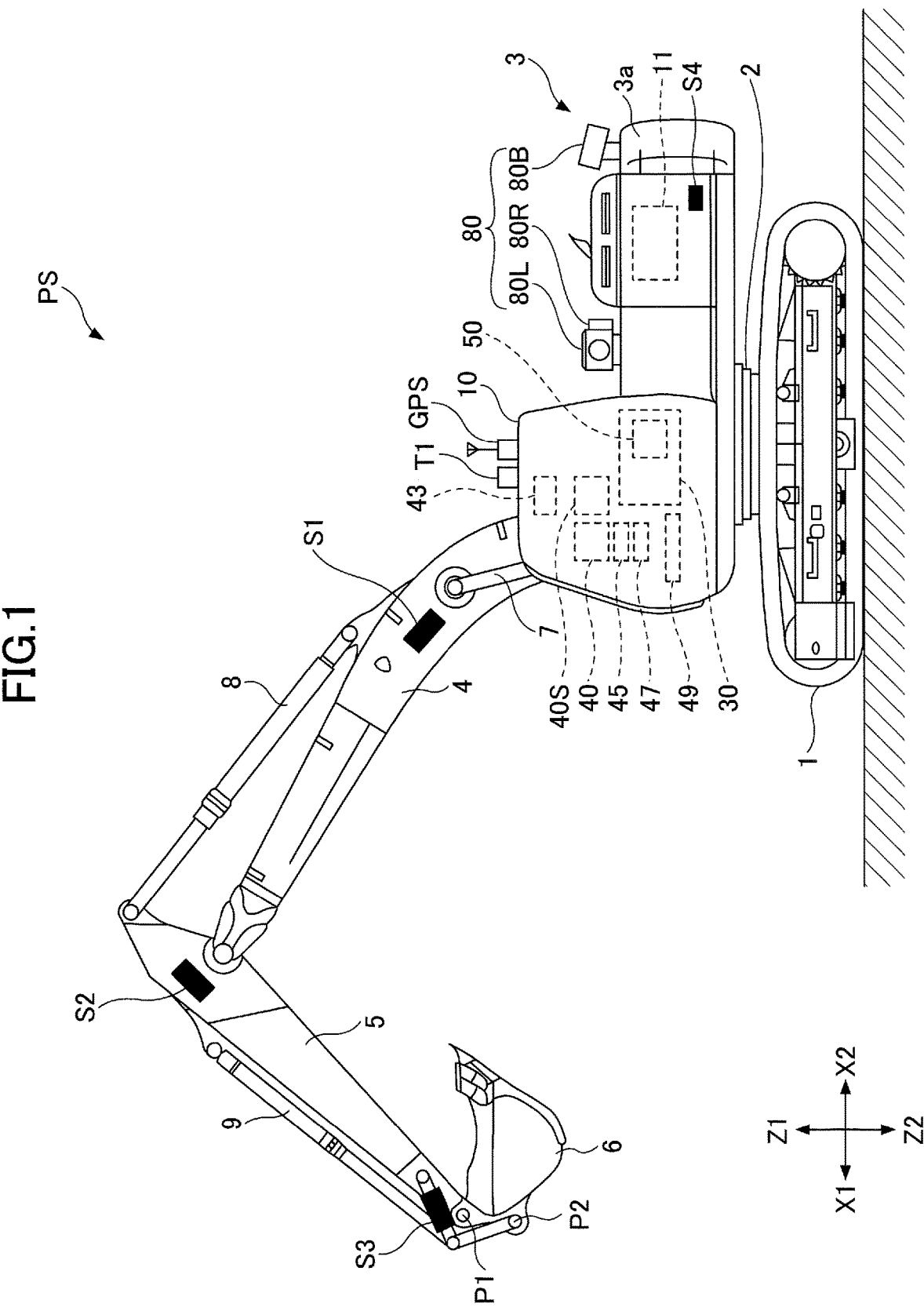
FIG. 1 is a side view illustrating an example of a shovel according to an embodiment of the present invention.

Hereinafter, a mode for carrying out the invention will be described with reference to the figures. In each figure, the same component part may be denoted by the same reference numeral and duplicate description of the component may be omitted.

FIG. 1 is a side view illustrating a shovel PS according to an embodiment of the present invention. In FIG. 1, arrow X1 represents the forward direction, arrow X2 represents the backward direction, arrow Z1 represents the upward direction, and arrow Z2 represents the downward direction.

Each of the directions is determined based on the operator who sits in the driver's seat.

As illustrated in FIG. 1, an upper swiveling body 3 is mounted in a lower traveling body 1 of the shovel PS in a rotatable manner via a swivel mechanism 2. A boom 4 is attached to the upper swiveling body 3. An arm 5 is attached to the tip of the boom 4. A bucket 6 is mounted at the tip of the arm 5 as an end attachment (a working part) by means of an arm top pin P1 and a bucket link pin P2. The end attachment may include a slope bucket, a dredging bucket, a breaker, and the like.

The boom 4, arm 5, and bucket 6 form a drilling attachment as an example of the attachment and are hydraulically driven by a boom cylinder 7, an arm cylinder 8, and a bucket cylinder 9, respectively. A boom angle sensor S1, an arm angle sensor S2, and a bucket angle sensor S3 are mounted on the boom 4, arm 5, and bucket 6, respectively. The excavation attachment may be provided with a bucket tilt mechanism.

The boom angle sensor S1 detects the rotation angle of the boom 4. The boom angle sensor S1 is an acceleration sensor that detects a tilt relative to a horizontal plane, for example, and detects a rotational angle of the boom 4 relative to the upper swiveling body 3.

The arm angle sensor S2 detects the rotational angle of the arm 5. The arm angle sensor S2 is, for example, an acceleration sensor that detects a tilt relative to a horizontal plane and detects an angle of rotation of the arm 5 relative to the boom 4.

The bucket angle sensor S3 detects the rotational angle of the bucket 6. The bucket angle sensor S3 is, for example, an acceleration sensor that detects a tilt relative to a horizontal plane and detects a rotational angle of the bucket 6 relative to the arm 5.

If the excavation attachment includes a bucket tilt mechanism, the bucket angle sensor S3 additionally detects the rotational angle of the bucket 6 about the tilt axis. The boom angle sensor S1, the arm angle sensor S2, and the bucket angle sensor S3 may be a potentiometer utilizing a variable resistor, a stroke sensor for detecting the stroke amount of the corresponding hydraulic cylinder, a rotary encoder for detecting the rotational angle around the coupling, and the like.

The upper swiveling body 3 is equipped with a power source such as an engine 11 and a body inclination sensor S4 and is covered by a cover 3a. The body inclination sensor S4 detects the inclination angle of the upper swiveling body 3. The body inclination sensor S4 is an acceleration sensor that detects, for example, an inclination relative to a horizontal plane and detects the inclination angle of the upper swiveling body 3.

An image capturing device 80 is provided on the top of the cover 3a of the upper swiveling body 3. The image capturing device 80 has a left camera 80L for capturing an image on the left side, a right camera 80R for capturing an image on the right side, and a rear camera 80B for capturing an image on the rear side, each from the upper swiveling body 3 to the cabin 10. The left camera 80L, the right camera 80R, and the rear camera 80B are digital cameras having imaging elements such as, for example, a CCD or a CMOS, each of which transmits the captured image to the first display device 40 provided in the cabin 10.

The upper swiveling body 3 is provided with a cabin 10 as an operator cab. The top of the cabin 10 is provided with a GPS device (GNSS receiver) GPS and a transmitting device T1. The GPS device GPS senses the position of the shovel PS by the GPS function and provides position data to the machine guidance device 50 in the controller 30. The transmitting device T1 transmits information to the outside of the shovel PS. Also provided within the cabin 10 are a controller 30, a first display device 40, a second display device 40S, an audio output device 43, an input device 45, a memory device 47, and a gate lock lever 49.

The controller 30 functions as a main control unit for controlling to drive the shovel PS. The controller 30 includes an arithmetic processing device including a CPU and an internal memory. Various functions of the controller 30 are implemented by the CPU executing a program stored in the internal memory.

The controller 30 also functions as a machine guidance device 50 that guides the operation of the shovel PS. The machine guidance device 50 informs the operator of working information, for example, the distance between the target surface, which is the target topography surface set by the operator, and the working part of the attachment. The distance between a target surface and the working part of the attachment is, for example, the distance between the tip of the bucket 6 as an end attachment (the toe), the back surface of the bucket 6, the tip of the breaker as an end attachment, and the target surface. The machine guidance device 50 informs the operator of the work information through a first display device 40, a second display device 40S, a voice output device 43, or the like and guides the operation of the shovel PS.

In the embodiment of the present invention, the machine guidance device 50 is incorporated into the controller 30, but the machine guidance device 50 and the controller 30 may be provided separately. In this case, the machine guidance device 50, like the controller 30, is formed of an arithmetic processing device including a CPU and internal memory. Various functions of the machine guidance device 50 are implemented by the CPU executing a program stored in internal memory.

The first display device 40 and the second display device 40S display images containing various working information in response to commands from the machine guidance device 50 included in the controller 30. The first display device 40 and the second display device 40S are in-vehicle liquid crystal displays connected, for example, to the machine guidance device 50.

In this embodiment, the screen size of the second display device 40S is larger than the screen size of the first display device 40. However, the screen size of the second display device 40S may be smaller than the screen size of the first display device 40.

The voice output device 43 outputs various types of voice information in response to voice output commands from the machine guidance device 50 included in the controller 30. The voice output device 43 includes, for example, an in-vehicle speaker connected to a machine guidance device 50. The voice output device 43 may also include an alarm such as a buzzer.

The input device 45 is a device for the operator of the shovel PS to input various information into the controller 30 including the machine guidance device 50. The input device 45 is formed of a membrane switch provided, for example, in the second display device 40S. The input device 45 may include, for example, a dimension setting screen switching switch for switching to a dimension setting screen for setting the dimensions, etc. of a bucket 6, a buzzer setting screen switching switch for switching to a buzzer setting screen for setting a buzzer frequency (high/low), a volume, and so on, a survey setting screen switching switch for switching to a survey setting screen for switching to whether or not to enable to use the survey mode, a reference point setting screen switching switch, a bucket bench set function switch, a swivel bench set function switch, and the like.

The input device 45 may also be individually provided corresponding to each of the first display device 40 and the second display device 40S. In this case, the input device 45 may include a touch panel or the like.

The memory device 47 is a device for storing various types of information. The memory device 47 is a non-volatile storage medium such as, for example, a semiconductor memory. The memory device 47 stores various types of information output by the controller 30, etc., including the machine guidance device 50.

The gate lock lever 49 is provided between the door of the cabin 10 and the driver's seat to prevent the shovel PS from being operated incorrectly. When the operator rides in the driver's seat and pulls up the gate lock lever 49, the operator is unable to exit the cabin 10 and can operate a variety of operating devices. When the operator pushes down the gate lock lever 49, the various operating devices. When the operator pushes down the gate lock lever 49, the operator can exit the cabin 10 and is unable to operate the various operating devices.

Figure 2:
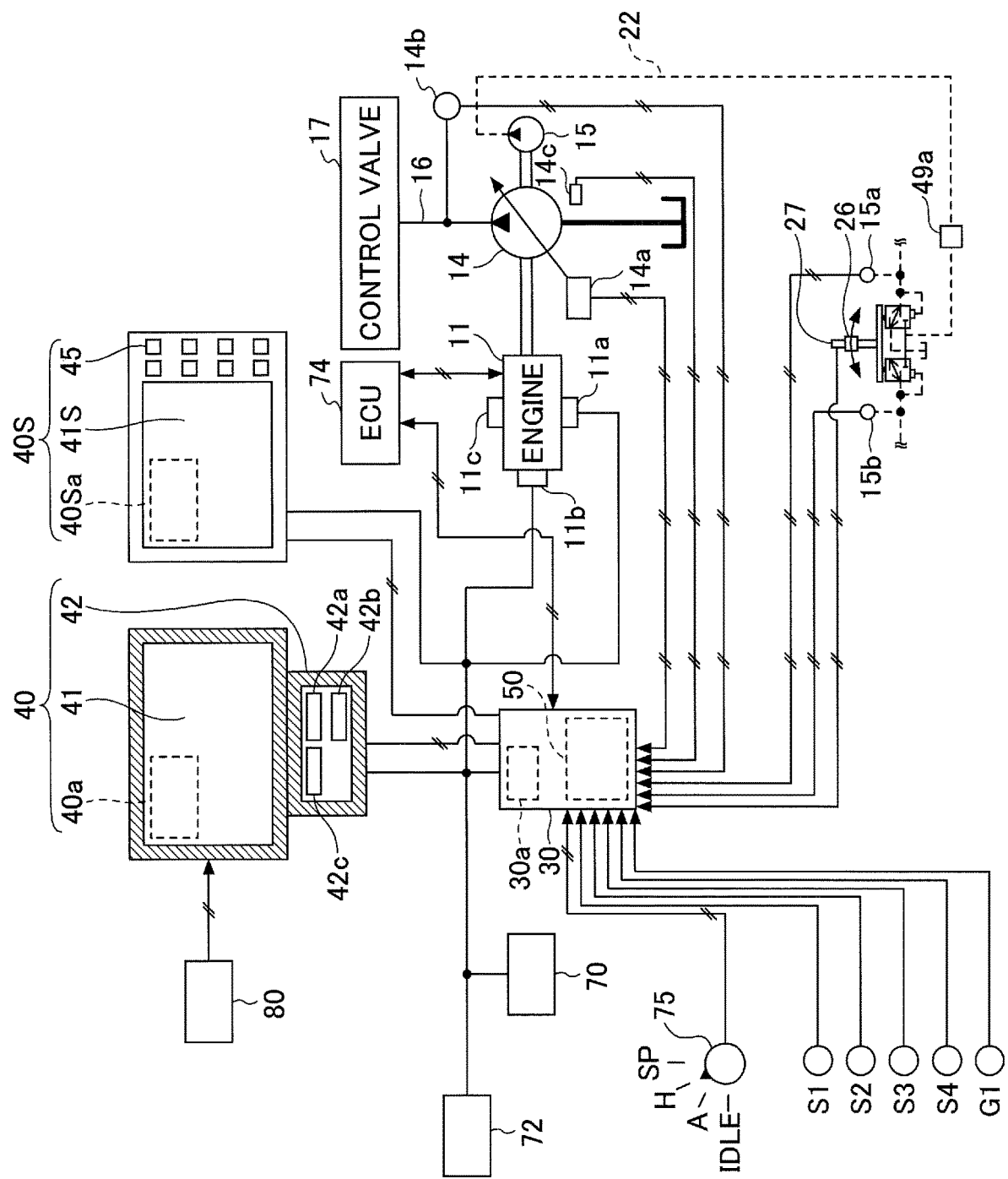
FIG. 2 illustrates an example of a connection configuration including a shovel controller of FIG. 1.

FIG. 2 illustrates an example of a connection configuration including a controller of the shovel illustrated in FIG. 1.

The first display device 40 and the second display device 40S are provided in the cabin 10 to display an image including work information provided by the machine guidance device 50. The first display device 40 and the second display device 40S are connected to the controller 30. Controller 30 includes a machine guidance device 50, such as via a communication network such as, for example, a CAN (Controller Area Network), a LIN (Local Interconnect Network), a dedicated line, or the like.

The first display device 40 includes a conversion processing unit 40a that generates an image to be displayed on the image display unit 41. The conversion processing unit 40a generates an image including an image to be displayed on the image display unit 41 based on the image data obtained from the image capturing device 80. The first display device 40 receives image data from each of the left camera 80L, the right camera 80R, and the rear camera 80B.

The conversion processing unit 40a converts the data to be displayed in the image display unit 41 out of the various types of data input from the controller 30 to the first display device 40 to the image signal. Data input from the controller 30 to the first display device 40 may include, for example, data indicative of the temperature of the engine cooling water, data indicative of the temperature of the hydraulic oil, data indicative of the remaining amount of urea water, data indicative of the remaining amount of fuel, and the like.

The conversion processing unit 40a outputs the converted image signal to the image display unit 41 and displays the captured image or an image generated based on various types of data in the image display unit 41. The conversion processing unit 40a may be provided, for example, in the controller 30 rather than the first display device 40. In this case, image capturing device 80 is connected to controller 30.

The first display device 40 includes a switch panel 42 as an input. The switch panel 42 is a panel that includes various hardware switches. The switch panel 42 includes a light switch 42a, a wiper switch 42b, and a window washer switch 42c.

The light switch 42a is a switch for switching the lights on and off which are mounted outside the cabin 10.

The wiper switch 42b is a switch for switching the wiper to operate and stop.

The window washer switch 42c is a switch for injecting window washer fluid.

The second display device 40S includes a conversion processing unit 40Sa that generates an image similar to the first display device 40. In this embodiment, the second display device 40S is not directly connected to the image capturing device 80.

Therefore, the conversion processing unit 40Sa does not generate an image including the captured image. However, the conversion processing unit 40Sa may generate an image including the captured image when the second display device 40S is directly connected to the image capturing device 80.

The conversion processing unit 40Sa converts the data to be displayed in the image display unit 41S out of the various types of data input from the controller 30 to the second display device 40S to the image signal. The conversion processing unit 40Sa outputs the converted image signal to the image display unit 41S and displays an image generated based on various types of data in the image display unit 41S. The conversion processing unit 40Sa may be provided, for example, in the controller 30, not in the second display device 40S.

The first display device 40 and the second display device 40S operate by receiving power from the battery 70. The battery 70 is charged with power generated by the alternator 11a (generator) of the engine 11. The power of the battery 70 is also supplied to the controller 30, the first display device 40, and the electrical components 72 of the shovel PS other than the second display device 40S. The starter 1ib of the engine 11 is also powered by power from the battery 70 to start the engine 11.

The engine 11 is connected to the main pump 14 and the pilot pump 15 and is controlled by an engine controller (ECU) 74. From the ECU 74, various data indicative of the states of the engine 11 (e.g., data indicative of the temperature (a physical quantity) of cooling water detected by the water temperature sensor 11c) is always transmitted to the controller 30. The controller 30 may store these data in the internal memory unit 30a and appropriately transmit these data to the first display device 40 and the second display device 40S.

The main pump 14 is a hydraulic pump for supplying hydraulic oil to the control valve 17 via a high pressure hydraulic line 16. The main pump 14 is, for example, a swash plate type variable capacity hydraulic pump.

The pilot pump 15 is a hydraulic pump for supplying hydraulic oil to various hydraulic control devices via a pilot line 22. The pilot pump 15 is, for example, a fixed capacity hydraulic pump.

The control valve 17 is a hydraulic controller that controls the hydraulic system in the shovel PS. The control valve 17 selectively supplies the hydraulic oil discharged by the main pump 14 to, for example, a boom cylinder 7, an arm cylinder 8, a bucket cylinder 9, a driving hydraulic motor, and a swiveling hydraulic motor. Hereinafter, a boom cylinder 7, an arm cylinder 8, a bucket cylinder 9, a hydraulic motor for driving, and a hydraulic motor for turning may be referred to as a "hydraulic actuator."

An operation device 26 is provided in cabin 10 and is used by an operator to operate the hydraulic actuator. When the operation device 26 is operated, hydraulic oil is supplied from the pilot pump to the pilot port of the flow control valve corresponding to each of the hydraulic actuators. Each pilot port is supplied with hydraulic oil at a pressure corresponding to the direction of operation and the amount of operation of the corresponding operation device 26.

The operation device 26 includes a boom control lever, an arm control lever, a bucket control lever, an operation lever for driving a hydraulic motor for driving, a hydraulic motor for turning, or the like, and an operation pedal.

When the operator operates the boom control lever, the boom cylinder 7 can be hydraulically driven to operate the boom 4. When the operator operates the arm control lever, the arm cylinder 8 can be hydraulically driven to operate the arm 5. When the operator operates the bucket control lever, the bucket cylinder 9 can be hydraulically driven to operate the bucket 6. When an operator operates an operation lever that drives a hydraulic motor for driving or a hydraulic motor for turning, a hydraulic motor for driving or a hydraulic motor for turning can be hydraulically driven to operate the lower traveling body 1 or the upper swiveling body 3.

The controller 30 acquires various types of data, such as those described below. The data acquired by the controller 30 is stored in the memory unit 30a.

The regulator 14a of the main pump 14, which is a variable capacity hydraulic pump, sends data indicating the swash plate angle to the controller 30. The discharge pressure sensor 14b transmits data representing the discharge pressure of the main pump 14 to the controller 30.

These data (data representing the physical amount) are stored in the memory unit 30a. The oil temperature sensor 14c provided in the line between the tank in which the hydraulic oil to be sucked by the main pump 14 is stored and the main pump 14 transmits data representing the temperature of the hydraulic oil flowing through the line to the controller 30.

The pressure sensors 15a, 15b detect the pilot pressure delivered to the control valve 17 when the operation device 26 is operated and send data indicating the detected pilot pressure to the controller 30. The operation device 26 is provided with a switch button 27. The operator can send a command signal to the controller 30 by operating the switch button 27 while operating the operation device 26.

An engine revolution speed adjustment dial 75 is provided in the cabin 10 of the shovel PS. The engine revolution speed adjustment dial 75 is a dial for adjusting the engine revolution speed, for example, a stepwise switch in engine revolution speed. In an embodiment of the present invention, the engine revolution speed adjustment dial 75 is provided so that the engine revolution speed can be switched to four stages: SP mode, H mode, A mode, and IDLE mode. The engine revolution speed adjustment dial 75 transmits data indicating the setting state of the engine revolution speed to the controller 30. Referring to FIG. 2, an H mode is selected by the engine revolution speed adjustment dial 75.

An SP mode is a revolution speed mode selected when priority is given to the quantity of work, and the highest engine revolution speed is used. The H mode is the revolution speed mode selected when the quantity of work and fuel efficiency are desired to balance, and uses the second highest engine revolution speed. An A mode is a speed mode selected when the shovel PS is operated with low noise while prioritizing fuel efficiency, and uses the third highest engine revolution speed. An IDLE mode is the revolution speed mode selected when the engine runs to be idle and uses the lowest engine revolution speed. The engine 11 is controlled to have a constant revolution speed in the revolution speed mode set by the engine revolution speed adjustment dial 75.

Figure 3:
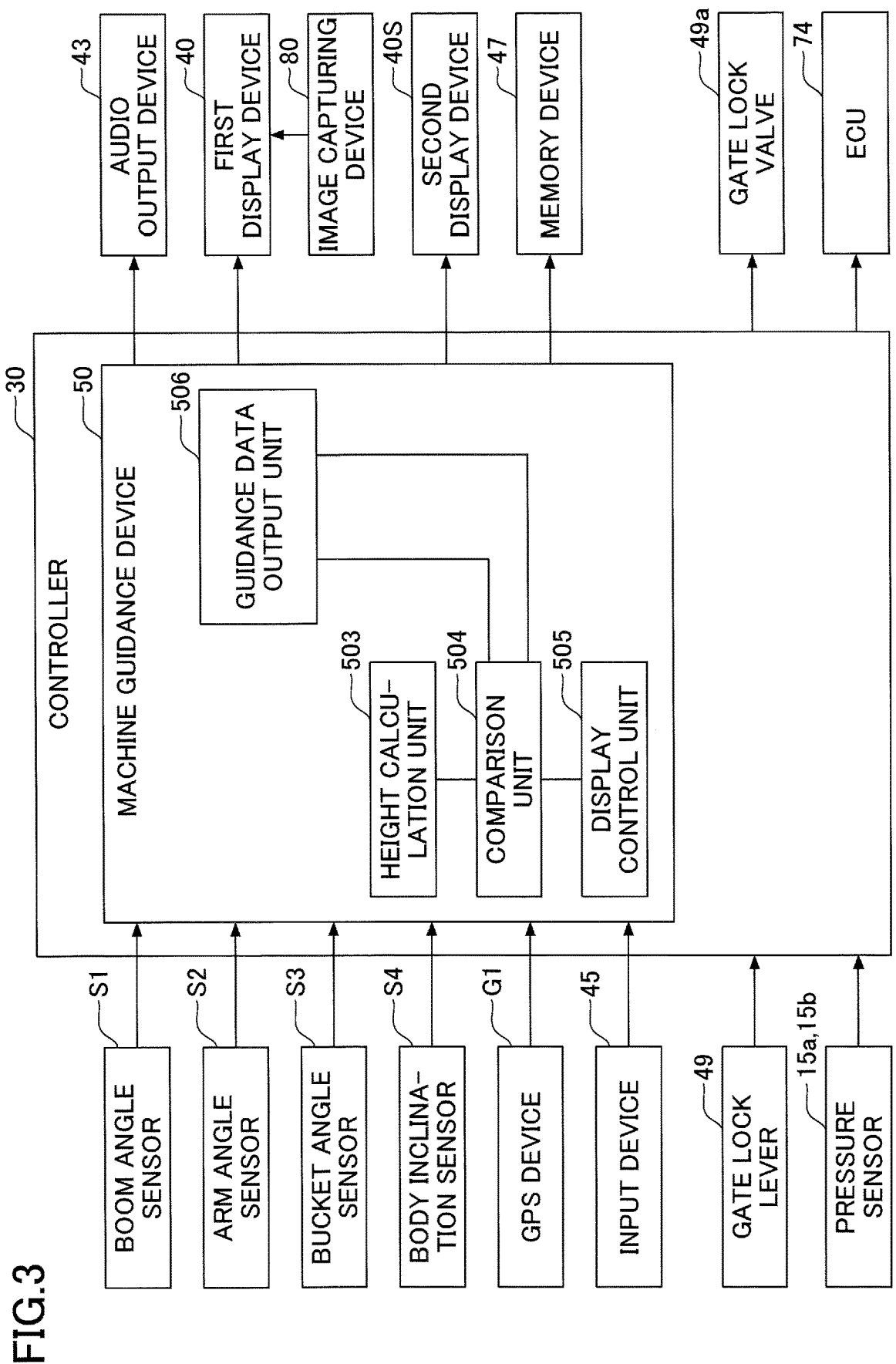
FIG. 3 illustrates an example of a configuration of a shovel controller and a machine guidance device of FIG. 1.

Next, various functions provided in the controller 30 of the shovel PS and the machine guidance device 50 will be described. FIG. 3 is a diagram illustrating an example of a configuration of the controller and the machine guidance device of FIG. 1.

The controller 30 controls the operation of the entire shovel PS including the ECU 74.

The controller 30 controls the gate lock valve 49a to be closed when the gate lock lever 49 is pushed down and the gate lock valve 49a to be open when the gate lock lever 49 is pulled up.

The gate lock valve 49a is a switching valve provided in an oil path between the control valve 17 and the operation device 26, etc., as illustrated in FIG. 2. The gate lock valve 49a is configured to open and close by instructions from the controller 30, but may be mechanically connected to the gate lock lever 49 and open and close in response to the operation of the gate lock lever 49.

The gate lock valve 49a shuts off the flow of hydraulic oil between the control valve 17 and the operation device 26 in a closed state to disable operations of the operation device 26 or the like. In addition, the gate lock valve 49a communicates hydraulic oil between the control valve 17 and the operation device 26 in an open state to enable an operation of the operation device 26 or the like.

The controller 30 detects the amount of operation of each operation device 26 from the pilot pressure detected by the pressure sensors 15a and 15b with the gate lock valve 49a open and the operation of the operation device 26 activated.

The controller 30 controls whether or not guidance is provided by the machine guidance device 50 in addition to controlling the overall operation of the shovel PS. For example, when the controller 30 determines that the shovel PS is in a pause state, it sends a guidance abort command to the machine guidance device 50 to stop guidance by the machine guidance device 50.

The controller 30 may also output a guidance stop command to the machine guidance device 50 when outputting an auto idle stop command to the ECU 74. Alternatively, the controller 30 may output a guidance abort command to the machine guidance device 50 if it determines that the gate lock lever 49 is depressed.

Next, the machine guidance device 50 will be described. The machine guidance device 50 receives various signals and data supplied to the controller 30 from a boom angle sensor S1, an arm angle sensor S2, a bucket angle sensor S3, a body inclination sensor S4, a GPS device GPS, an input device 45, and the like.

The machine guidance device 50 calculates the actual operating position of the attachment, such as the bucket 6, based on the received signals and data. The machine guidance device 50 compares the actual operating position of the attachment with the target surface, and calculates, for example, the distance between the bucket 6 and the target surface.

The machine guidance device 50 also calculates the distance from the pivot center axis of the shovel PS to the toe of the bucket 6 and the angle of inclination of the target surface, and transmits these to the first display device 40 and the second display device 40S as working information. The machine guidance device 50 may transmit these working information only to the second display device 40S.

If the machine guidance device 50 and the controller 30 are provided separately, the machine guidance device 50 and the controller 30 are communicatively connected to each other via a CAN.

The machine guidance device 50 includes a height calculation unit 503, a comparison unit 504, a display control unit 505, and a guidance data output unit 506.

The height calculation unit 503 calculates the height of the tip (nail tip) of the bucket 6 from the angle of the boom 4, the arm 5, and the bucket 6 obtained from the detection signal of the boom angle sensor S1, the arm angle sensor S2, and the bucket angle sensor S3.

The comparison unit 504 compares the height of the tip (nail tip) of the bucket 6 calculated by the height calculation unit 503 with the position of the target surface indicated in the guidance data output from the guidance data output unit 506. The comparison unit 504 determines the angle of inclination of the target surface relative to the shovel PS. Various types of data obtained in the height calculation unit 503 or the comparison unit 504 are stored in the memory device 47.

The display control unit 505 transmits the height of the bucket 6 determined by the comparison unit 504 and the inclination angle of the target surface to the first display device 40 and the second display device 40S as work information. The first display device 40 displays the work information transmitted from the display control unit 505 on the screen along with the captured image transmitted from the image capturing device 80. The second display device 40S displays the work information transmitted from the display control unit 505 on the screen. In addition, when the bucket 6 is positioned lower than the target surface, the display control unit 505 may issue an alarm to the operator via the voice output device 43.

Figure 4A:
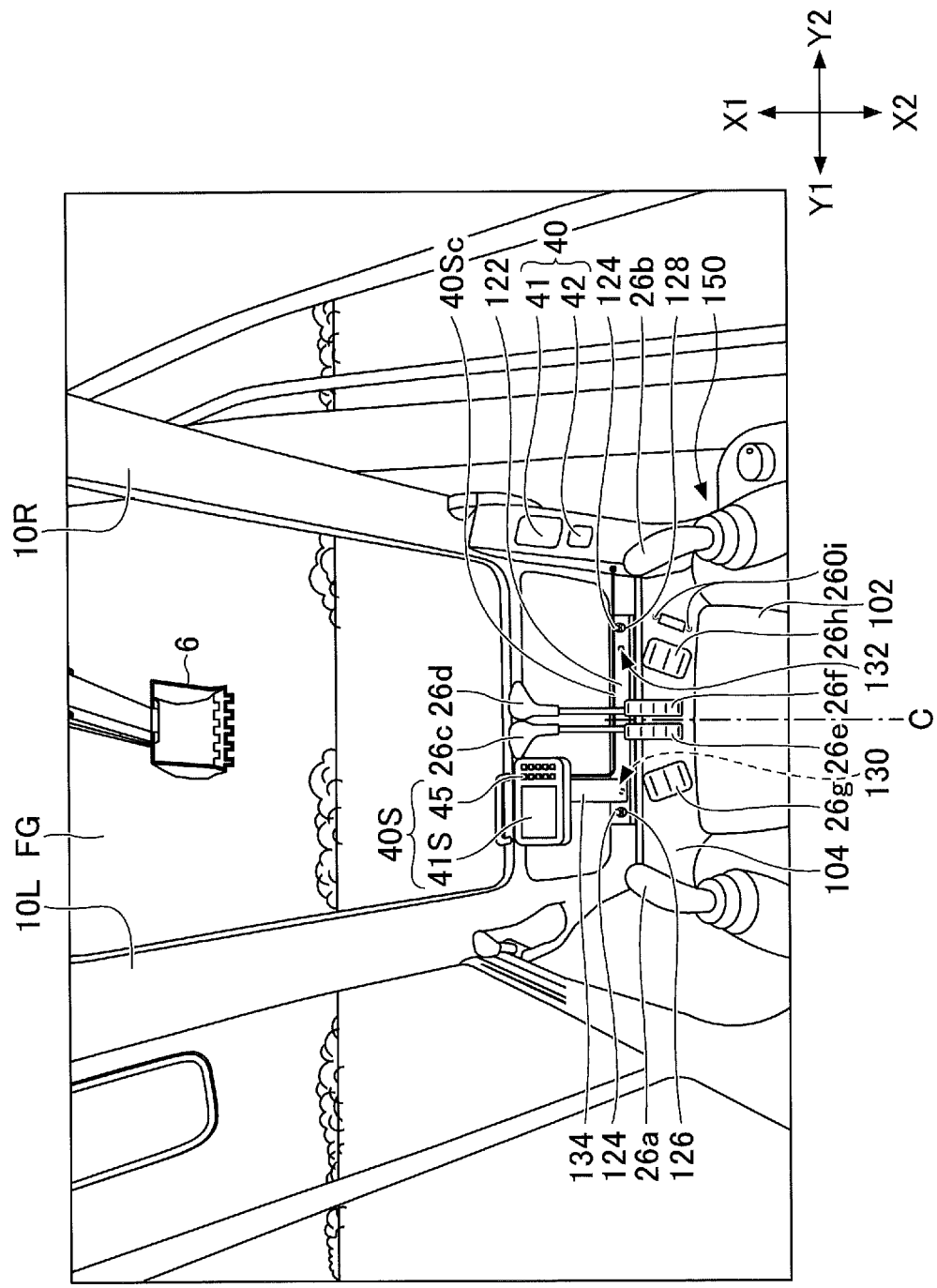
FIG. 4A is a view obtained in a shovel illustrated in FIG. 1 when viewing forward from an inside of a cabin.

Next, an example of the attaching position of the first display device 40 and the second display device 40S provided in the cabin 10 will be described. FIGS. 4A and 4B are viewed forward from within the cabin 10 of the shovel of FIG. 1. FIG. 4A illustrates a second display device 40S mounted on the left front of the driver's seat 102, and FIG. 4B shows a second display device 40S mounted on the right front of the driver's seat 102. In each figure, arrow X1 represents the forward direction, arrow X2 represents the rear direction, arrow Y1 represents the left direction, arrow Y2 represents the right direction, arrow Z1 represents the upward direction, and arrow Z2 represents the downward direction. Each direction is based on the operator who sits in the driver's seat.

As shown in FIGS. 4A and 4B, the first display device 40 is attached to a right pillar 10R so as to fit within the width of the right pillar 10R on the right front of the driver's seat 102. This is to enable an operator sitting toward the front in the driver's seat 102 to see the first display device during operation. Specifically, the first display device 40 can be captured by a peripheral field of view when the bucket 6 is captured by a central field of view of the operator through a windshield FG.

Also, as illustrated in FIGS. 4A and 4B, the second display device 40S can be mounted in a different position in at least a left-to-right direction in front of the driver's seat 102. In the illustrated example, the second display device 40S is mounted on the left or right side of the cabin 10 relative to the center line C, which is equidistant from the left and right sides of the cabin 10. Depending on the content of the work and the working part, the visibility for the work may be blocked if installed on the right side or the visibility for the work may be blocked if installed on the left side. This is to prevent the visibility for the work from being blocked depending on the work content and the working part.

Figure 5:
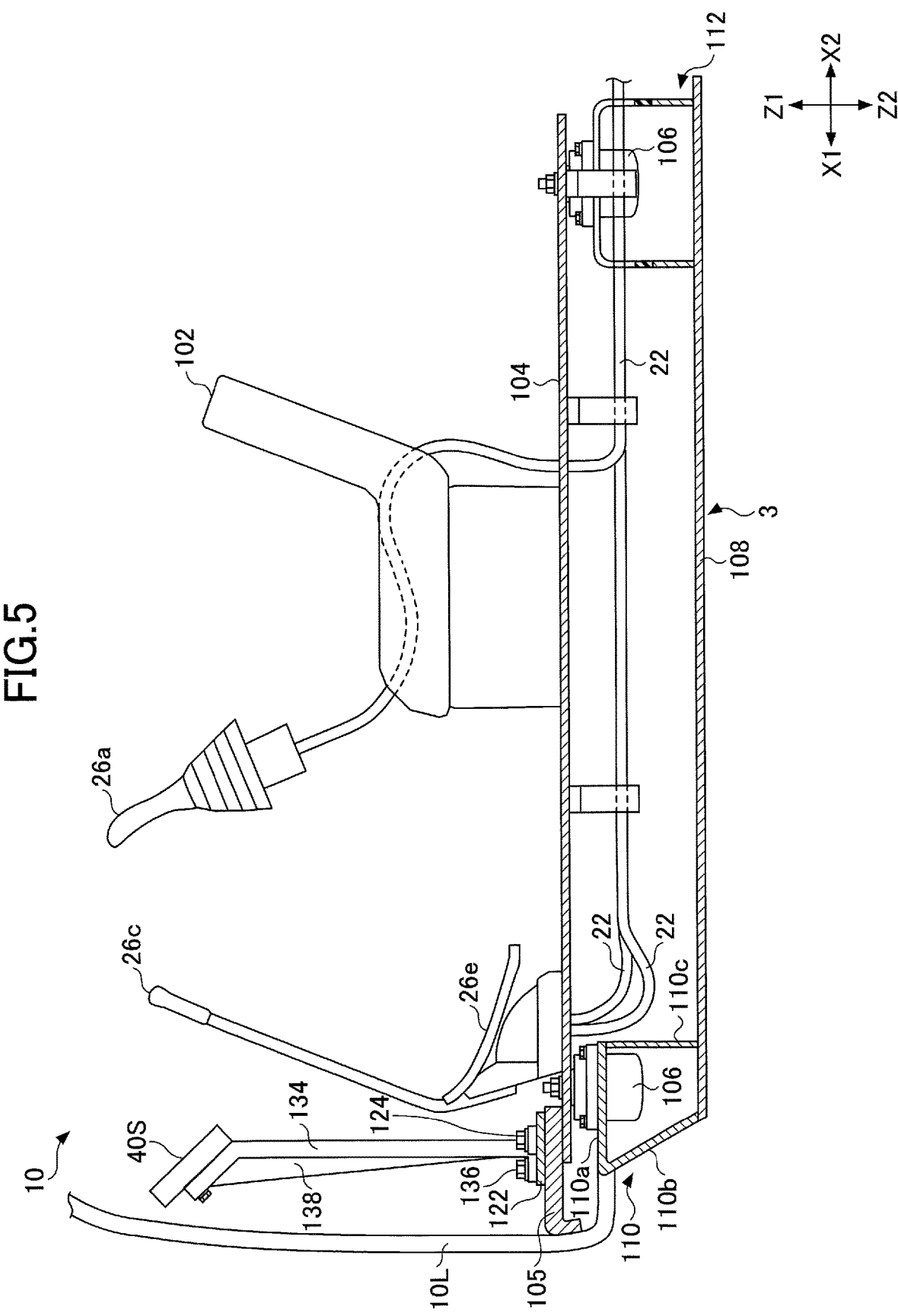
FIG. 5 is a cross-sectional view illustrating an example of the structure of the cabin of the shovel of FIG. 1.
Figure 6:
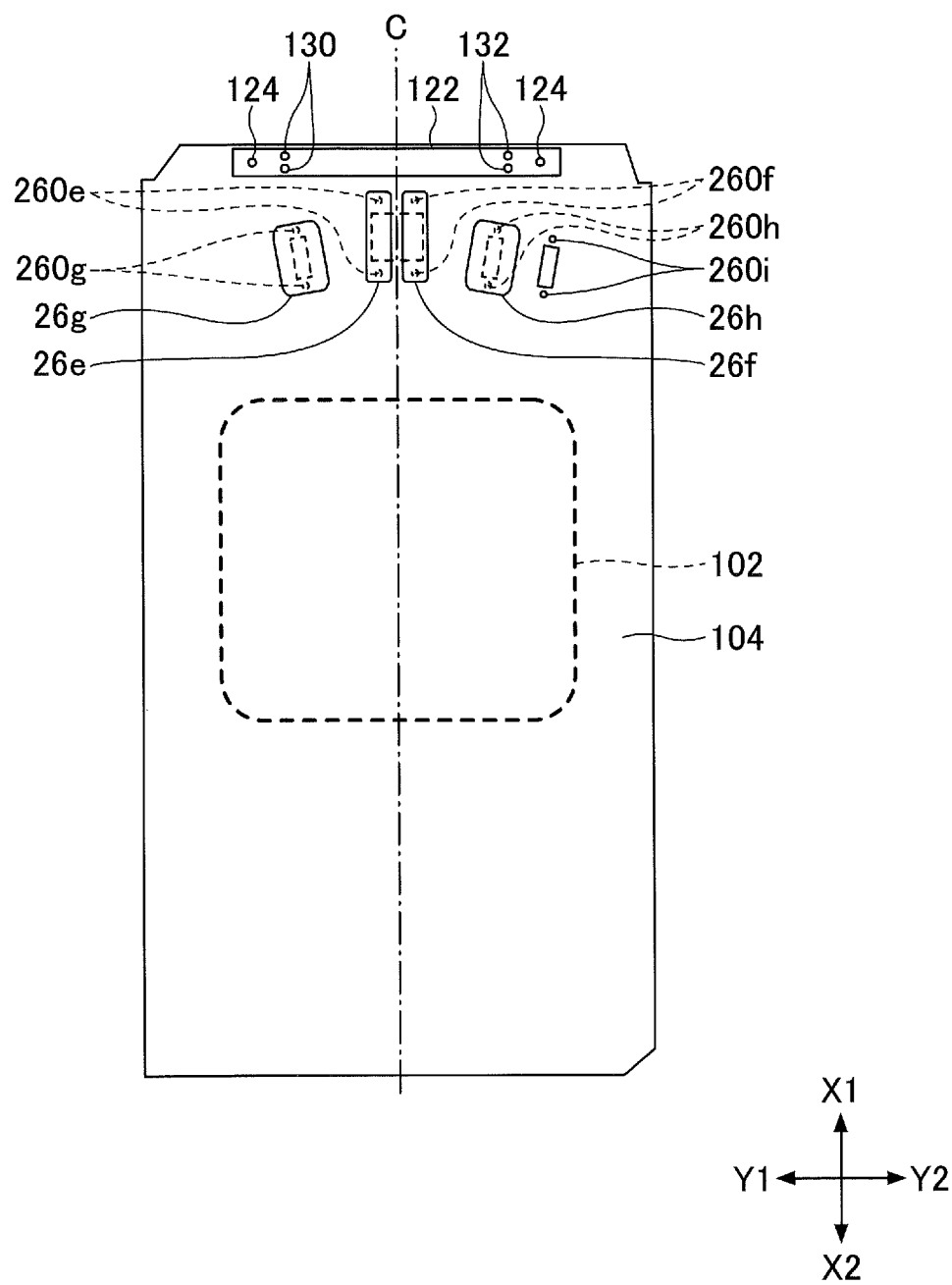
FIG. 6 is a plan view illustrating the example of the structure of the cabin of the shovel of FIG. 1.

Hereinafter, the attaching position of the second display device 40S will be described in detail. FIG. 5 is a cross-sectional view illustrating an example of the structure of the cabin 10 of the shovel of FIG. 1. FIG. 6 is a plan view illustrating an example of a structure of the cabin of the shovel of FIG. 1. In each figure, arrow X1 represents the forward direction, arrow X2 represents the rear direction, arrow Y1 represents the left direction, arrow Y2 represents the right direction, arrow Z1 represents the upward direction, and arrow Z2 represents the downward direction. Each direction is based on the operator who sits in the driver's seat.

As illustrated in FIG. 5, the shovel PS includes a floor member 104, which is a plate-like member covering the lower portion of the cabin 10, and a frame 108 positioned below the floor member 104.

The floor member 104 is secured to the tip frame 105 secured to a left pillar 10L and the right pillar 10R by welding or the like, using a fastening member 124 such as a bolt.

The floor member 104 and the tip frame 105 are made of, for example, steel plates.

The frame 108 forms the upper swiveling body 3 and is pivotably mounted to the lower traveling body 1. The frame 108 supports the floor member 104 through a damping device 106 that attenuates vibration from the lower traveling body 1. The frame 108 has a front transverse beam 110 and a rear transverse beam 112.

The front transverse beam 110 extends laterally and supports the front portion of the floor member 104 through a pair of damping devices 106 (only one is illustrated in FIG. 5). The front transverse beam 110 includes a horizontal upper surface portion 110a, a front surface portion 110b extending backward from the front edge of the upper surface portion 110a and a rear surface portion 110c extending downwardly from the rear edge of the upper surface portion 110a, and the damping device 106 is fastened to the upper surface portion 110a with bolts or the like. The front transverse beam 110 is formed, for example, by bending steel plates.

The rear transverse beam 112 extends laterally as well as the front transverse beam 110 and supports the rear portion of the floor member 104 via the pair of damping devices 106 (only one is shown in FIG. 5). The rear transverse beam 112 is formed, for example, by bending steel plates.

Above the floor member 104 is a driver's seat 102 to be seated by the operator. The operator seating in the driver's seat 102 can see the bucket 6 from the window in front of the cabin 10. In the vicinity of the driver's seat 102, the operation device 26 is provided for accepting operation by the operator.

As shown in FIGS. 4A and 4B, the operation device 26 includes an operation lever 26a, 26b, 26c, 26d, an operation pedal 26e, 26f, and so on. The operation levers 26a and 26b are provided on both sides of the driver's seat 102 to drive the attachments (the boom 4, the arm 5, and the bucket 6) and to operate swiveling of the upper swiveling body 3. The operation levers 26c and 26d are provided in front of the driver's seat 102 as a pair of left and right to operate the lower traveling body 1. The operation pedals 26e and 26f are provided directly connected to the operation levers 26c and 26d on the front floor member 104 of the driver's seat 102, respectively, and operate the lower traveling body 1 in a manner similar to the operation levers 26c and 26d. Footrests 26g and 26h are respectively provided outside the operation pedals 26e and 26f. The footrests 26g and 26h support the body by placing the foot on the operating pedals 26e and 26f when these are not operated.

The operation pedals 26e and 26f and the footrests 26g and 26h are secured to predetermined positions of the floor member 104 by fastening members such as bolts. Specifically, as illustrated in FIG. 6, attaching holes 260e, 260f, 260g, and 260h are formed in the floor member 104 in positions to mount the operation pedals 26e and 26f and the footrests 26g and 26h, respectively. The operation pedals 26e and 26f, and the footrest 26g and 26h are secured to the floor member 104 by fastening members such as bolts, using the attaching holes 260e, 260f, 260g, and 260h, respectively.

Further, provided on the right side of the footrest 26h is a attaching hole 260i for attaching a spare pedal, such as an operation pedal for operating the attachment. In this embodiment, the attaching hole 260i is not equipped with a spare pedal, such as an operation pedal, but a spare pedal may be attached as needed.

Also connected to the operation levers 26a, 26b, 26c, 26d and the operation pedals 26e, 26f are a pilot line as illustrated in FIG. 5. The pilot line 22 transmits the hydraulic pressure indicative of operation of operation levers 26a, 26b, 26c, 26d and operation pedals 26e, 26f to the control valve 17.

Provided forward the driver's seat 102 and above the front transverse beam 110 is a monitor attaching base 122, which is tightened with the tip frame 105 and secured to the floor member 104. Therefore, the monitor attaching base 122 can be secured to the floor member 104 without opening a new attaching hole for attaching the monitor attaching base 122 to the floor member 104.

The monitor attaching base 122 is a longitudinally elongated plate-like member extending laterally within the cabin 10 and is formed, for example, of an SS material (rolled steel for general structure). The thickness of the monitor attaching base 122 is formed to be thicker than the thickness of the floor member 104 of the cabin 10 in terms of increasing strength. Various longitudinal ends of the monitor attaching base 122 are formed with insertion holes 126 and 128. The insertion holes 126 and 128 are passed through a fastening member 124 for securing the aforementioned floor member 104 to the tip frame 105. That is, the monitor attaching base 122 is secured to the floor member 104 in conjunction with the tip frame 105.

The monitor attaching base 122 has a first attaching portion 130 and a second attaching portion 132 formed at different longitudinal locations.

The first attaching portion 130 is provided on the left side of the cabin 10 and on the left side of the center line C, which is an equal distance from the right side. The first attaching portion 130 is configured to mount the second display device 40S via a support arm 134 and is, for example, one or more attaching holes that penetrate the thickness of the monitor attaching base 122.

In the illustrated example, the first attaching portion 130 comprises two attaching holes. The support arm 134 is then secured to the monitor attaching base 122 by inserting and threading the bolts 136 through the attaching holes formed in the support arm 134 and the attaching holes formed in the monitor attaching base 122. The first attaching portion 130 is positioned on the left side of the operation lever 26c so as not to interfere with the operation of the operation lever 26c by the operator.

The second attaching portion 132 is provided on the right side of the cabin 10 above the center line C, which is an equal distance from the left and right sides of the cabin 10. The second attaching portion 132 is configured to mount the second display device 40S via a support arm 134 and is, for example, one or more attaching holes that penetrate the thickness of the monitor attaching base 122.

In the illustrated example, the second attaching portion 132 comprises two attaching holes.

The support arm 134 is then secured to the monitor attaching base 122 by inserting and threading the bolts 136 through the attaching holes formed in the support arm 134 and the attaching holes formed in the monitor attaching base 122. The second attaching portion 132 is positioned on the right side of the operation lever 26d so as not to interfere with the operation of the operation lever 26d by the operator.

The support arm 134 is a support rod for attaching the second display device 40S to the monitor attaching base 122. The support arm 134 is secured to the monitor attaching base 122 by a fastening member such as a bolt 136. At this time, it is preferable that the support arm 134 be secured to the monitor attaching base 122 by a plurality (e.g., four or more) fastening members in order to increase the strength. A rib 138 is also provided in the front and/or rear of the support arm 134. This prevents the support arm 134 from shaking in the forward and backward directions. In the illustrated example, a rib 138 is provided in front of the support arm 134. The support arm 134 may also be a bracket that is rotatable and inclined to support the second display device 40S.

In this manner, the monitor attaching base 122 is provided with a first attaching portion 130 and a second attaching portion 132 which are forward from the driver's seat 102 and are capable of attaching the second display device 40S on the left and right sides of the cabin 10, respectively, than the center line C, which is an equal distance from the left and right sides of the cabin 10.

Accordingly, the second display device 40S can be disposed on the left side or the right side in front of the operator, depending on the work content and the working part. As a result, the convenience of the operator of the shovel is improved.

The wiring 40Sc including a power line and a signal line of the second display device 40S is also arranged in the console 150 to the right of the driver's seat 102, as shown, for example, in FIGS. 4A and 4B. The signal lines of the second display device 40S are connected through the console 150 to the controller 30 located behind the driver's seat 102. The wiring 40Sc, including the power line and the signal line, may be arranged outside the console 150.

Figure 7:
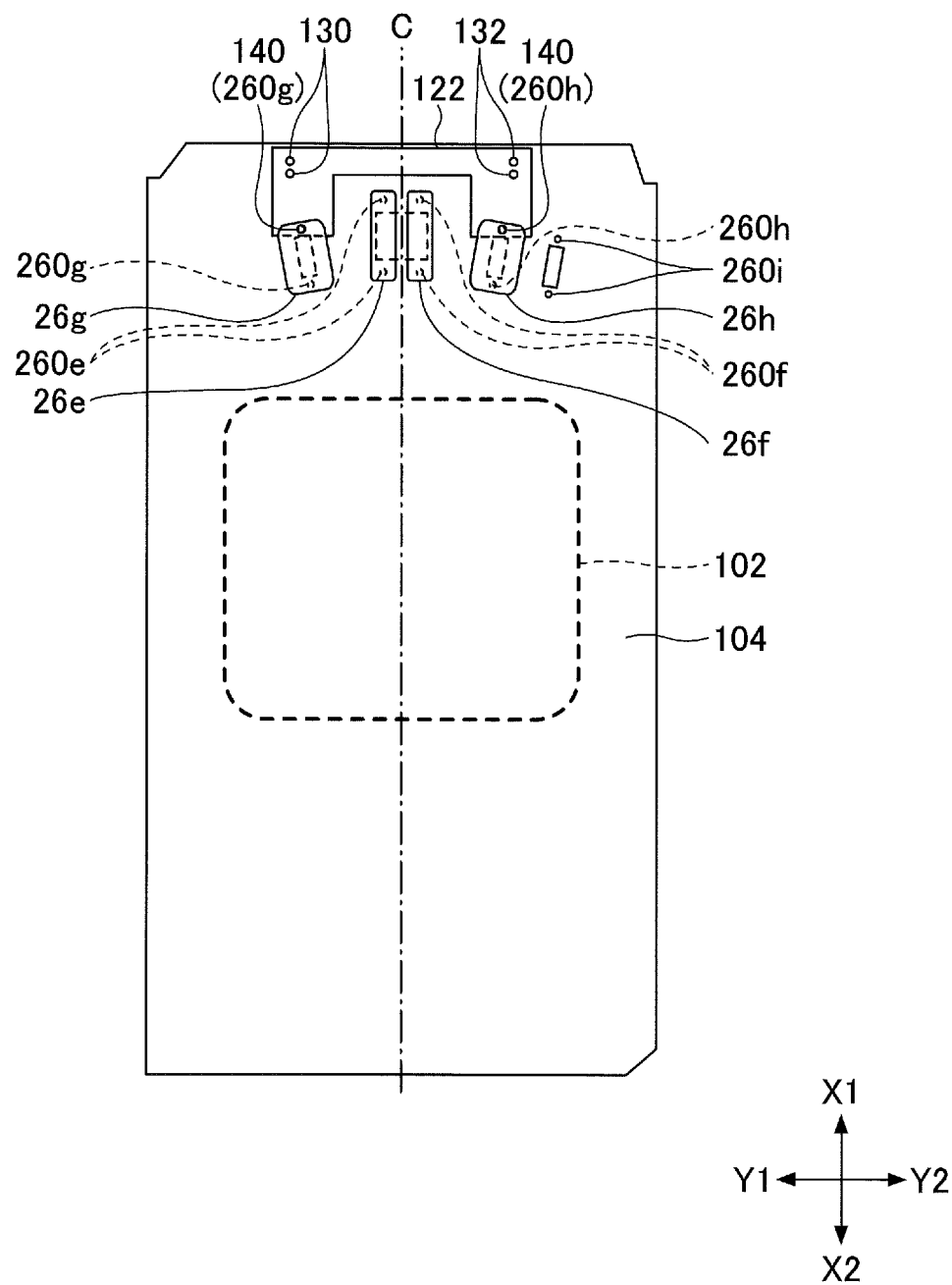
FIG. 7 is a plan view illustrating another example of the structure of the cabin of the shovel of FIG. 1.

Next, another example of the attaching position of the first display device 40 and the second display device 40S provided in the cabin 10 will be described. FIG. 7 is a plan view illustrating another example of the construction of the cabin of the shovel of FIG. 1. In FIG. 7, arrow X1 represents the forward direction, arrow X2 represents the backward direction, arrow Y1 represents the left direction, and arrow Y2 represents the right direction. Each direction is based on the operator who sits in the driver's seat.

In the shovel PS illustrated in FIG. 7, a monitor attaching base 122 is secured to the floor member 104 together with a footrest 26g and 26h. In other words, the monitor attaching base 122 is secured to the floor member 104 by fastening members 140, such as existing bolts, using attaching holes 260g and 260h used to secure the footrest 26g and 26h to the floor member 104. Therefore, the monitor attaching base 122 can be secured to the floor member 104 without opening a new attaching hole for attaching the monitor attaching base 122 to the floor member 104.

The monitor attaching base 122 may be secured to the floor member 104 by a fastening member using the attaching holes 260g and 260h used to secure the operation pedals 26e and 26f to the floor member 104. The monitor attaching base 122 may also be secured to the floor member 104 by a fastening member using a attaching hole 260i used in attaching the spare pedal. Further, the monitor attaching base 122 may be secured to the frame 108 of the upper swiveling body 3 using a fastening member such as an existing bolt which secures the floor member 104 to the frame 108 of the upper swiveling body 3.

Figure 8:
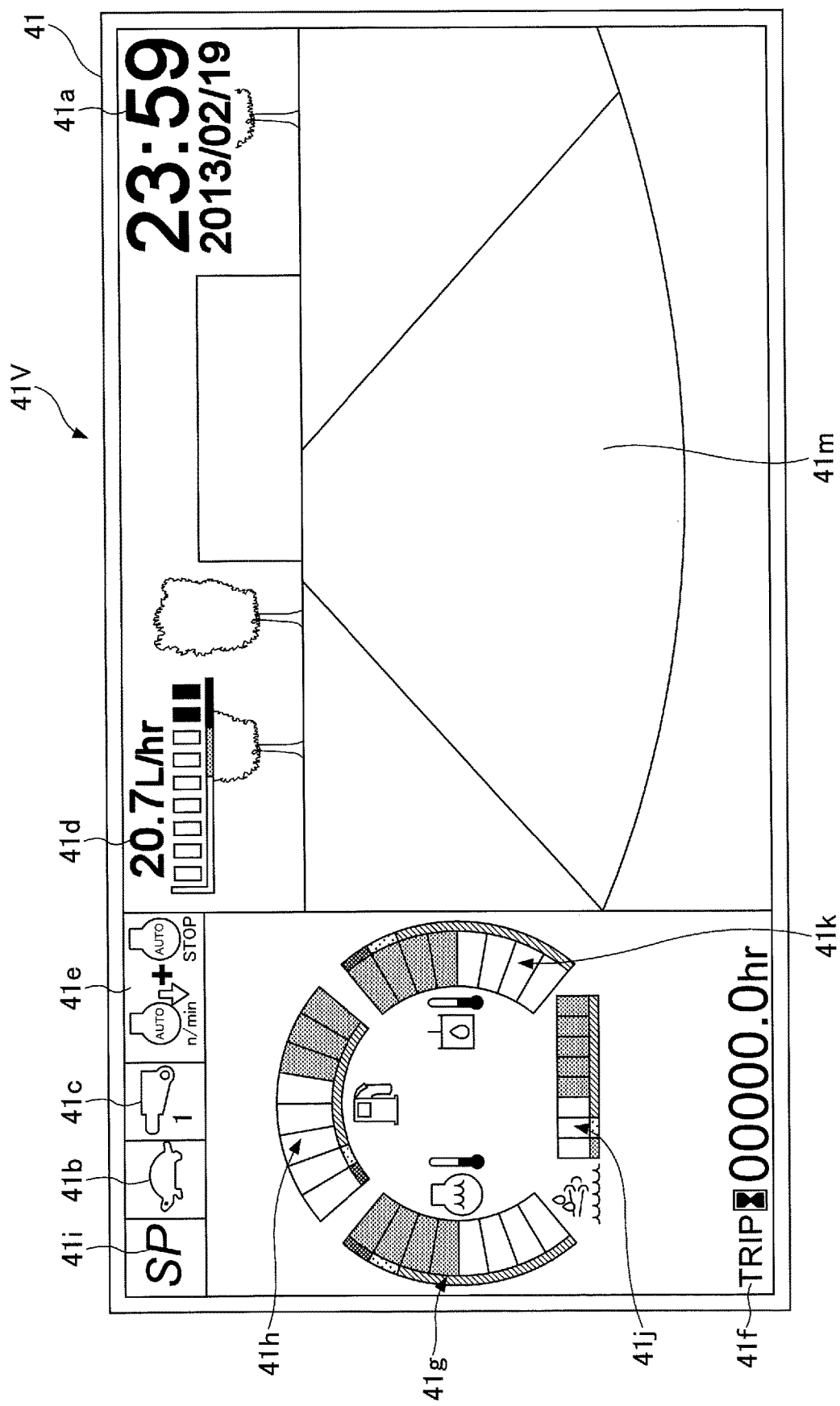
FIG. 8 is a view illustrating an example of an image displayed on the image display unit of a first display device.

Next, an example of a screen configuration displayed on the image display unit 41 of the first display device 40 will be described. FIG. 8 illustrates an example of the main screen 41V displayed in the image display unit 41 of the first display device 40.

The main screen 41V includes a date and time display area 41a, a travel mode display area 41b, an attachment display area 41c, an average fuel efficiency display area 41d, an engine control status display area 41e, an engine operating time display area 41f, a cooling water temperature display area 41g, a fuel remaining amount display area 41h, a revolution speed mode display area 41i, a urea water remaining amount display area 41j, a hydraulic oil temperature display area 41k, and a camera image display area 41m.

The travel mode display area 41b, the attachment display area 41c, the engine control status display area 41e, and the revolution speed mode display area 41i are examples of the setting status display unit which displays the setting status of the shovel. The average fuel efficiency display area 41d, the engine operating time display area 41f, the cooling water temperature display area 41g, the fuel remaining amount display area 41h, the urea water remaining amount display area 41j, and the hydraulic oil temperature display area 41k are examples of operation status display portions indicating the operation status of the shovel.

The date and time display area 41a is an area that displays the current date and time. The travel mode display area 41b is an area that displays the current travel mode. The attachment display area 41c is an area that displays an image representing the currently mounted attachment. The average fuel efficiency display area 41d is the area that displays the current average fuel economy.

The engine control status display area 41e is an area that displays the control status of the engine 11. The cooling water temperature display area 41g is an area indicating the temperature status of the current engine cooling water.

The fuel remaining display area 41h is an area indicating the remaining amount of fuel stored in the fuel tank 55. The revolution speed mode display area 41i is an area that displays the current revolution speed mode. The urea water remaining display area 41j is an area indicating the remaining amount of urea water stored in the urea water tank. The hydraulic oil temperature display area 41k is an area indicating the temperature status of the hydraulic oil in the hydraulic oil tank. The camera image display area 41m is the area where the camera image is displayed.

Figure 9:
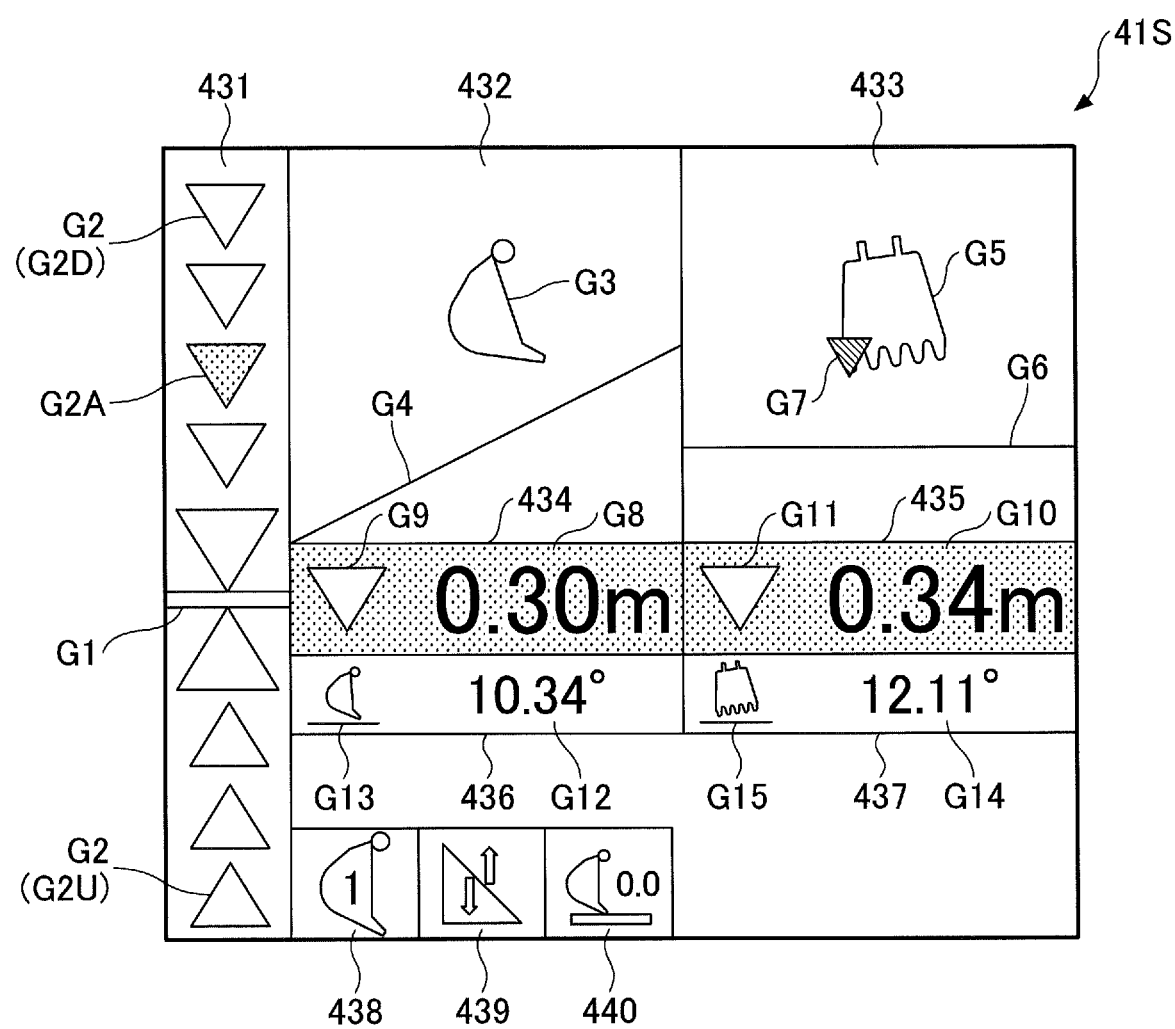
FIG. 9 is a view illustrating an example of a main screen displayed on an image display unit of a second display device.

Next, an example of an image displayed on the image display unit 41S of the second display device 40S will be described. FIG. 9 illustrates an example of an image displayed on the image display unit 41S of the second display device 40S. In the example of FIG. 9, the image display unit 41S includes a position display image 431, a first target construction surface display image 432, a second target construction surface display image 433, a bucket left end information image 434, a bucket right end information image 435, a side view numerical information image 436, a front view numerical information image 437, an attachment image 438, a distance form image 439, and a target set image 440, which display nail tip guidance information, as an example of working part guidance information.

The position display image 431 is an example of the first image representing a change in the size of the relative distance from the work part (tip) of the bucket 6 to the target construction surface by changing the display position of the work part (tip) of the bucket 6 with respect to the display position of the target construction surface. In the example of FIG. 9, the position display image 431 is a bar gauge with multiple geometries (segments) arranged vertically. The position display image 431 includes a target segment G1 as a first diagram and multiple segments G2 as a second diagram.

The target segment G1 is a diagram showing the position of the target construction surface. In the present embodiment, a shape (straight line) is shown indicating that the relative distance from the working part (tip) of the bucket 6 to the target construction surface is within a predetermined range. The predetermined range is previously set as the appropriate range of the relative distance. The relative distance is within a predetermined range, which means that the working part of the bucket 6 is in the proper position. The target segment G1 is positioned at the same height as the second image.

The second image represents a change in the size of the working part distance of the attachment relative to the target construction surface by changing the display form at the same location. The display form in the same place includes, for example, icons, background colors, numbers, and the like. The change in the display form of the second image is a change in at least one of the icon shape, color, and number. In this embodiment, the second image is a combination of the bucket left end information image 434 and the bucket right end information image 435. The target segment G1 is positioned at the same height as each of the bucket left end information image 434 and the bucket right end information image 435.

For example, the target segment G1, the bucket left end information image 434, and the bucket right end information image 435 are arranged so that the central height in the vertical direction coincides.

The segments G2 are diagrams corresponding to predetermined relative distances. The smaller the corresponding relative distance, the segment G2, the closer it is to the target segment G1. The greater the corresponding relative distance, the more distant it is from the target segment G1.

Each of the segments G2 shows the direction of movement of the bucket 6 with its relative distance. The direction of movement of the bucket 6 is the direction of bringing the working part of the bucket 6 closer to the target construction surface.

In the present embodiment, segment G2D represents moving the bucket 6 downward to approach the target construction surface, and segment G2U represents moving the bucket 6 upward to approach the target construction surface.

The position display image 431 displays segment G2 corresponding to the actual relative distance from the working part (tip) of the bucket 6 to the target construction surface in a predetermined color different from that of the other segments G2.

The segment G2 having a different color from other segments G2 is called segment G2A. Position display image 431 shows the relative distance and direction of movement by displaying segment G2A in a predetermined color.

The larger the relative distance from the working part (tip) of the bucket 6 to the target construction surface, the more segment G2 distant from the target segment G1 is displayed in a predetermined color as the segment G2A, and the smaller the relative distance from the working part (tip) of the bucket 6 to the target construction surface, the more segment G2 closer to the target segment G1 is displayed in a predetermined color as the segment G2A.

In this manner, segment G2A is displayed such that its position varies upward and downward in response to a change in relative distance.

The segment G2A is displayed in the first color when the relative distance is greater than the maximum value of the predetermined range. The first color is a non-conspicuous color such as, for example, white or yellow. This is because the need to alert the operator is reduced when the relative distance is greater than the maximum value in the predetermined range. The segment G2A is also displayed in a second color when the relative distance is within a predetermined range.

The second color is conspicuous, such as green. This is to inform the operator that the bucket 6 is in place. The segment G2A is also displayed in a third color when the relative distance is less than the minimum value of a predetermined range. The third color is conspicuous, such as red. This is to alert the operator that there is a possibility that the target construction surface may be further reduced by the working portion of the bucket 6.

The position display image 431 also displays the target segment G1 in a predetermined color that is different from the other segments if the actual relative distance of the bucket 6 is within a predetermined range. That is, the position display image 431 indicates that the relative distance is within a predetermined range by displaying the target segment G1 in a predetermined color. Preferably, the target segment G1 is displayed in the second color described above. This is to understandably inform the operator that the bucket 6 is in the proper place.

Note that while the segment G2A and the target segment G1 are displayed in a predetermined color, the other segment G2 may or may not be displayed in a non-conspicuous color (such as a color identical to or similar to the background color).

The first target construction surface display image 432 schematically displays the relationship between the bucket 6 and the target construction surface. In the first target construction surface display image 432, the bucket 6 and the target construction surface when viewed from the side are displayed schematically in the bucket icon G3 and the target construction surface image G4. The bucket icon G3 is a drawing representing the bucket 6 and is represented as viewing the bucket 6 from the side surface.

The target construction surface image G4 is a drawing representing the ground surface as the target construction surface. As with the bucket icon G3, it is represented in the form when viewed from the side surface. The target construction surface image G4 may be displayed along with an angle formed between a line segment representing the target construction surface and a horizontal line in a vertical plane longitudinally sectional to the bucket 6 (the target slope angle θ, hereinafter referred to as a "vertical inclined angle").

The longitudinal spacing between the bucket icon G3 and the target construction surface image G4 is displayed to vary depending on the change in the distance between the front end of the actual bucket 6 and the target construction surface.

The relative inclination angle between the bucket icon G3 and the target construction surface image G4 is also displayed to vary according to the change in the relative inclination angle between the actual bucket 6 and the target construction surface.

In the present embodiment, the display height and the display angle of the target construction surface image G4 are configured to change with the bucket icon G3 fixed. However, the display height and the display angle of the bucket icon G3 may be configured to change with the target construction surface image G4 fixed, and the display height and the display angle of each of the bucket icon G3 and the target construction surface image G4 may be configured to change.

The second target construction surface display image 433 schematically displays the relationship between the bucket 6 and the target construction surface and the working part. The second target construction surface display image 433 schematically displays the bucket 6, the target construction surface, and the working part when the operator sits in the cabin 10 and sees the front of the shovel, with the bucket icon G5, the target construction surface image G6, and the working part image G7.

The bucket icon G5 is a graphic representation of the bucket 6, represented by the bucket 6 when the operator sits in the cabin 10 and looks forward to the shovel. The target construction surface image G6 is a drawing representing the ground surface as the target construction surface. As with the bucket icon G5, it is represented when an operator sits in the cabin 10 and looks ahead of the shovel.

The target construction surface image G6 may be displayed with an angle formed between a line segment representing the target construction surface and a horizontal line in a vertical plane across the bucket 6 (the target slope angle θ, hereinafter referred to as a "horizontal inclined angle"). The working part image G7 is a diagram illustrating the working part of the bucket 6. The working part is the part of the tip of the bucket 6 selected by the operator.

Of the tips of the bucket 6, the operator can select the left end (the nail tip at the left end), the right end (the nail tip at the right end), and the center (the nail tip at the center) as the working part.

Here, the left and right sides are left and right when the operator sits in the cabin 10 and sees the front of the shovel.

In the example of FIG. 9, the left end of the bucket 6 is selected as the working part. Therefore, the working part image G7 is displayed superimposed on the left edge of the bucket icon G5. The longitudinal spacing between the bucket icon G5 and the target construction surface image G6 is displayed to vary depending on the change in the distance between the front end of the actual bucket 6 and the target construction surface.

The relative inclination angle between the bucket icon G5 and the target construction surface image G6 is also displayed to vary according to the change in the relative inclination angle between the actual bucket 6 and the target construction surface. The working part image G7 corresponds to the position display image 431.

Specifically, the distance between the target construction surface image G6 and the working part image G7 corresponds to the distance between the target segment G1 and the segment G2A in the position display image 431.

The operator can grasp the positional relationship between the bucket 6 and the target construction surface and the vertical inclined angle of the large body of the target construction surface by viewing the first target construction surface display image 432. In addition, the target construction surface image G4 inclined more than the actual inclination angle may be displayed in the first target construction surface display image 432 in order to increase visibility of the operator.

In addition, when the operator wishes to know the precise vertical inclined angle, the actual vertical inclined angle can be obtained by viewing the value of the vertical inclined angle displayed in the target construction surface image G4. The same applies to the target second construction surface display image 433.

The bucket left end information image 434 as the second image displays the distance between the distal left end of the bucket 6 and the target construction surface. In the example of FIG. 9, the bucket left end information image 434 is displayed at the bottom of the first target construction surface display image 432. The bucket left end information image 434 displays the left end distance G8 and the direction icon G9. The left end distance G8 is a numerical value indicating the distance between the left end of the bucket 6 and the target construction surface.

The left end distance G8 is indicated by a positive value when the left end of the bucket 6 is above the target construction surface. The left end distance G8 is indicated by a negative value when the left end of the bucket 6 is located below the target construction surface. The left end distance G8 is 0.30 m in the example shown in FIG. 9. The operator can know the exact left-hand distance by viewing the left-hand distance G8, which is numerically displayed on the bucket left-hand information image 434. The directional icon G9 is a diagram showing the direction of movement of the bucket 6.

The direction of movement of the bucket 6 is to bring the left end of the bucket 6 closer to the target construction surface. In the example of FIG. 9, the directional icon G9 shows a downward direction because the left end of the bucket 6 is above the target construction surface.

The color of the background of the directional icon G9 and the bucket left end information image 434 is displayed to vary with the change in left end distance G8. As a directional icon G9, for example, the shape of segment G2A and target segment G1, which are displayed when the left edge distance G8 is adopted as a relative distance, is displayed.

The right end information image 435 of the bucket as the second image displays the distance between the front right end of the bucket 6 and the target construction surface. In the example of FIG. 9, the bucket right end information image 435 is displayed at the bottom of the second target construction surface display image 433 adjacent to the right side of the bucket left end information image 434.

That is, the bucket left end information image 434 and the bucket right end information image 435 are displayed at the same height. The right end information image 435 of the bucket displays the right end distance G10 and the direction icon G11. The right end distance G10 is a numerical value indicating the distance between the right end of the tip of the bucket 6 and the target construction surface. The right end distance G10 is indicated by a positive value when the right end of the bucket 6 is located above the target construction surface.
The right end distance G10 is indicated by a negative value when the right end of the bucket 6 is located below the target construction surface.

In the example illustrated in FIG. 9, the right end distance G10 is 0.34 m, which is different from the value of the left end distance G8. This is because, in the example of FIG. 9, the tip of the bucket 6 is inclined relative to the target construction surface. The operator can know the exact right edge distance by viewing the right edge distance G10, which is numerically displayed on the right edge information image 435 of the bucket. The directional icon G11 is a diagram showing the direction of movement of the bucket 6. The direction of movement of the bucket 6 is to bring the right end of the bucket 6 closer to the target construction surface.

In the example of FIG. 9, the directional icon G11 illustrates a downward direction because the right tip of the bucket 6 is above the target construction surface. The color of the background of the directional icon G11 and the bucket right end information image 435 is displayed to vary with the change of the right end distance G10. As the directional icon G11, for example, the shape of segment G2A and target segment G1 is displayed when the right edge distance G10 is adopted as a relative distance.

Specifically, the background of the bucket left end information image 434 is displayed in the first color when the left end distance G8 is greater than the maximum value of the predetermined range. The first color is an unremarkable color such as, for example, white or yellow. This is because there is less need to alert the operator when the left end distance G8 is greater than the maximum value in the predetermined range.

The background of the bucket left end information image 434 is displayed in a second color when the left end distance G8 is within a predetermined range.
The second color is conspicuous, such as green. This is to inform the operator that the left end of the bucket 6 is in place. The background of the bucket left end information image 434 is displayed in a third color when the left end distance G8 is less than the minimum value of a predetermined range. The third color is conspicuous, such as red. This is to alert the operator that the left end of the bucket 6 may cause excessive cutting of the target construction surface. The same applies to the right end information image 435 of the bucket.

The side view numerical information image 436 displays the relationship between the bucket 6 when viewed from the side and the target construction surface. In the example of FIG. 9, the side view numerical information image 436 is displayed at the bottom of the bucket left end information image 434. The side view numerical information image 436 displays a longitudinal bucket angle G12 and a longitudinal bucket icon G13. The longitudinal bucket angle G12 is a numerical value indicating the relative angle between the back surface of the bucket 6 and the target construction surface in a vertical plane extending through the bucket 6. The longitudinal bucket angle G12 is 10.34° in the example of FIG. 9. The operator can know the exact longitudinal bucket angle by viewing the value of the vertical bucket angle G12, which is numerically displayed on the side view numerical information image 436. The longitudinal bucket icon G13 is a diagram schematically representing the longitudinal bucket angle G12. The longitudinal bucket icon G13 is represented, for example, in the form of a bucket 6 and a target construction surface as viewed from the side of the bucket 6 with reference to the target construction surface.

In this embodiment, the slope of the bucket portion in the longitudinal bucket icon G13 is represented by an inclination of three steps. The inclination of the three steps respectively indicate that the longitudinal bucket angle G12 is positive, zero, and negative. However, the slope of the bucket portion in the longitudinal bucket icon G13 may be fixed and displayed to vary with the change in the longitudinal bucket angle G12.

The front view numerical information image 437 displays the relationship between the bucket 6 and the target construction surface when the operator sits in the cabin 10 and sees the front of the shovel. In the example of FIG. 9, the front view numerical information image 437 is displayed at the bottom of the bucket right end information image 435 adjacent to the right side of the side view numerical information image 436. The front view numerical information image 437 displays the transverse bucket angle G14 and the transverse bucket icon G15. The transverse bucket angle G14 is a numerical value indicating the relative angle between the toe of the bucket 6 and the target construction surface in a vertical plane across the bucket 6. The transverse bucket angle G14 is 12.11° in the example of FIG. 9. The operator can know the correct transverse bucket angle by viewing the value of the transverse bucket angle G14, which is numerically displayed on the frontal numerical information image 437.

The transverse bucket icon G15 is a diagram schematically representing a transverse bucket angle G14. The transverse bucket icon G15 is represented, for example, in the form of a bucket 6 and a target construction surface as the operator sits in the cabin 10 and sees the front of the shovel relative to the target construction surface. In this embodiment, the slope of the bucket portion in the transverse bucket icon G15 is represented by a three-step slope, as in the case of the longitudinal bucket icon G13. The inclination of the three steps respectively indicate that the transverse bucket angle G14 is positive, zero, and negative. However, the inclination of the bucket portion in the transverse bucket icon G15 may be fixed and displayed to vary with the change in the transverse bucket angle G14.

The attachment image 438 is an image representing the attached attachment. In the example of FIG. 9, the attachment image 438 is displayed at the lower end of the working guidance display 430. The various end attachments, such as the bucket 6, a drill, a grappl, a lifting magnet, and the like are mounted on the shovels.
The attachment image 438 displays, for example, a number corresponding to the marks and attachments elephant to these end attachments. The number of the attachment is previously registered.

In the example of FIG. 9, the attachment image 438 shows that a bucket 6 corresponding to number 1 is mounted as the end attachment. If a rock shaker is mounted as the end attachment, for example, the attachment image 438 displays a mark representing a rock shaver along with a number corresponding to the rock shaker.

The distance form image 439 is an image representing a display form such as a left end distance G8 displayed on the bucket left end information image 434 and a right end distance G10 displayed on the bucket right end information image 435.

In the example of FIG. 9, the distance form image 439 is displayed at the lower end of the working guidance display 430 adjacent to the right side of the attachment image 438. The left end distance G8 and the right end distance G10 are presented in either a vertical distance display form or a normal distance display form. The vertical distance is the vertical distance to the target construction surface. The normal distance is the distance in the normal direction relative to the target construction surface. The operator may select a display form for the left-hand distance G8 and the right-hand end distance G10 in a vertical distance display form or a normal distance display form.

Left end distance G8 and right end distance G10 are displayed in a display form selected by the operator. distance form image 439 displays marks illustrating the display form selected by the operator. In the example of FIG. 9, the left end distance G8 and the right end distance G10 are presented in a vertical distance display form.

The target set image 440 is an image indicating whether or not the target value or the target construction surface has been set. In the example of FIG. 9, the target set image 440 is displayed at the lower end of the working guidance display 430 adjacent to the right side of the distance form image 439. The target set image 440 displays a mark corresponding to whether or not the target value or the target construction surface has been set. In the example of FIG. 9, the target set image 440 represents that the target value and the target construction surface have already been set.

Although the above-described embodiments have been described, the above-described contents are not intended to limit the content of the invention, and various modifications and improvements can be made within the scope of the present invention.

In the above-described embodiment, two attaching portions (the first attaching portion 130 and the second attaching portion 132) capable of attaching the second display device 40S are provided on the monitor attaching base 122. However, three or more attaching portions may be provided. When three or more attaching portions are provided, the degree of freedom of the attaching position of the second display device 40S is increased.

For example, the monitor attaching base 122 may be provided with a slide rail capable of attaching the second display device 40S. By providing a slide rail on the monitor attaching base 122, the degree of freedom of the attaching position of the second display device 40S is increased. The slide rails may be provided with a locking mechanism, for example, to secure the second display device 40S in a desired position. Alternatively, for example, the slide rail may be provided in place of the monitor attaching base 122.

According to an embodiment of the present invention, a attaching position of a display device can be changed depending on work content and a working part. Reference symbols indicate as follows.
1: lower traveling body
3: upper swiveling body
10: cabin
26c, 26d: operation lever
26e, 26f: operation pedal
40: first display device
40S: second display device
104: floor member
108: frame
110: front transverse beam
122: monitor attaching base
130: first attaching portion
132: second attaching portion
134: support arm
138: rib.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the shovel has been described in detail, it should be understood that the various changes, substitutions, and alterations could be made hereto without departing from the spirit and scope of the invention.

What is claimed is:
1. A shovel comprising:
a lower travelling body;
an upper swiveling body that is mounted on the lower travelling body so as to freely swivel relative to, the lower travelling body;
an operator cab that is mounted on the upper swiveling body;
a display device provided in the operator cab;
a pair of footrests provided in a front of the operator cab; and
a monitor attaching base including a plurality of attaching portions to one of which the display device is attached in front of the pair of footrests, the plurality of attaching portions being provided at different positions in right and left directions in the operator cab to allow a change in an attachment position of the display device,
wherein the monitor attaching base and the pair of footrests are attached to a floor member of the operator cab.
2. The shovel according to claim 1,
wherein the plurality of attaching portions includes a first attaching portion disposed on a left side of a center line between a left side surface of the operator cab and a right side surface of the operator cab at an equal distance from the right and left side surfaces, and a second attaching portion disposed on the right side of the center line.
3. The shovel according to claim 2,
wherein an operation lever configured to control the lower traveling body is provided in the operator cab,
wherein the first attaching portion is disposed on a left side of the operation lever, and
wherein the second attaching portion is disposed on a right side of the operation lever.
4. The shovel according to claim 3,
wherein the first attaching portion and the second attaching portion are disposed ahead the operation lever.
5. The shovel according to claim 1,
wherein the monitor attaching base is secured to the upper swiveling body by being tightened in conjunction with the operator cab.

6. The shovel according to claim 1,
wherein the monitor attaching base is located above a transverse beam on a front side of the upper swiveling body.

7. The shovel according to claim 1,
wherein an operation pedal configured to control the lower traveling body is attached to the operator cab, and
wherein the monitor attaching base is secured to the floor member by a fastening member that secures the operation pedal to the floor member.

8. The shovel according, to claim 1,
wherein the monitor attaching base is formed of a long plate-like member, and
wherein the thickness of the monitor attaching base is thicker than a thickness of the floor member of the operator cab.

9. The shovel according to claim 1,
wherein the monitor attaching base is secured to the floor member by a plurality of fastening members.

10. The shovel according to claim 1, further comprising:
a support arm that is secured to one of the plurality of attaching portions to support the display device.

11. The shovel according to claim 10,
wherein the support arm is secured to the monitor attaching base by a plurality of fastening members.

12. The shovel according to claim 10,
wherein a rib is provided on a front or a rear of the support arm.

13. The shovel according to claim 1, wherein the monitor attaching base has a plate shape extending laterally between a front of the operator cab and the pair of footrests.

\* \* \* \* \*